United States Patent
Honma et al.

(10) Patent No.: US 8,864,625 B2
(45) Date of Patent: Oct. 21, 2014

(54) CONTROLLER OF STEPPED AUTOMATIC TRANSMISSION

(75) Inventors: Tomoaki Honma, Isehara (JP); Masahiro Iriyama, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 14/122,428

(22) PCT Filed: Feb. 16, 2012

(86) PCT No.: PCT/JP2012/053698
§ 371 (c)(1),
(2), (4) Date: Nov. 26, 2013

(87) PCT Pub. No.: WO2012/164979
PCT Pub. Date: Dec. 6, 2012

(65) Prior Publication Data
US 2014/0106931 A1    Apr. 17, 2014

(30) Foreign Application Priority Data
Jun. 1, 2011    (JP) .................................. 2011-123154

(51) Int. Cl.
| | |
|---|---|
| *B60W 10/04* | (2006.01) |
| *B60W 10/11* | (2012.01) |
| *F02D 41/00* | (2006.01) |
| *B60W 10/06* | (2006.01) |
| *B60W 30/18* | (2012.01) |
| *B60W 10/115* | (2012.01) |
| *F02D 41/12* | (2006.01) |
| *B60W 30/19* | (2012.01) |
| *F02D 29/02* | (2006.01) |
| *F02D 41/02* | (2006.01) |

(52) U.S. Cl.
CPC .............. *B60W 10/06* (2013.01); *B60W 10/11* (2013.01); *F02D 2250/21* (2013.01); *F02D 41/023* (2013.01); *F02D 41/0087* (2013.01); *B60W 30/18072* (2013.01); *B60W 10/115* (2013.01); *F02D 41/126* (2013.01); *B60W 30/19* (2013.01); *F02D 29/02* (2013.01)
USPC ........................... 477/110; 477/101; 477/109

(58) Field of Classification Search
CPC ........... B60W 30/18072; F16H 61/061; F16H 61/686; F16H 63/502; F16H 2061/0087
See application file for complete search history.

(56) References Cited

U.S. PATENT DOCUMENTS

| | | | | |
|---|---|---|---|---|
| 7,503,873 B2 * | 3/2009 | Nakajima et al. | ............. | 477/107 |
| 8,290,668 B2 * | 10/2012 | Hirasako et al. | ................ | 701/51 |
| 2010/0250074 A1 * | 9/2010 | Hirasako et al. | ................ | 701/55 |

FOREIGN PATENT DOCUMENTS

| | | |
|---|---|---|
| CN | 101844557 A | 9/2010 |
| JP | 9-280352 A | 10/1997 |

(Continued)

OTHER PUBLICATIONS

Chinese Office Action, Apr. 16, 2014, 6 pages.

(Continued)

*Primary Examiner* — David D Le
(74) *Attorney, Agent, or Firm* — Foley & Lardner LLP

(57) ABSTRACT

Disclosed is a controller of a stepped automatic transmission. The stepped automatic transmission has a plurality of lock-up elements and performs downshift during coasting while an engine has a fuel cut-off state by changing over a pair of lock-up elements including an open side lock-up element and a lock-up side lock-up element. Downshift operation includes torque phase control and inertia phase control. The controller includes: a fuel cut-off recovery executing unit that is configured to perform recovery from the fuel cut-off state for an inertia phase control period; and a cylinder number restricting unit that is configured to restrict a count of cylinders recovered from the fuel cut-off state.

3 Claims, 8 Drawing Sheets

(56) References Cited

FOREIGN PATENT DOCUMENTS

| | | |
|---|---|---|
| JP | 2008-169874 A | 7/2008 |
| JP | 2010-60065 A | 3/2010 |
| JP | 2010-78124 A | 4/2010 |
| JP | 2010/223403 A | 10/2010 |
| JP | 2011-99337 A | 5/2011 |
| JP | 2012251575 A * | 12/2012 |
| KR | 10-2010-0107406 A | 10/2010 |

OTHER PUBLICATIONS

Korean Office Action dated May 23, 2014, 3 pages.

* cited by examiner

|      | B1 Fr/B | C1 I/C | C2 D/C | C3 H&LR/C | B2 LOW/B | B3 2346/B | B4 R/B | F1 | F2 |
|------|---------|--------|--------|-----------|----------|-----------|--------|----|----|
| 1st  | (○)     |        |        | (○)       | ○        |           |        | ○  | ○  |
| 2nd  |         |        |        | (○)       | ○        | ○         |        |    | ○  |
| 3rd  |         |        | ○      |           | ○        | ○         |        |    |    |
| 4th  |         |        | ○      | ○         |          | ○         |        |    |    |
| 5th  |         | ○      | ○      | ○         |          |           |        |    |    |
| 6th  |         | ○      |        | ○         |          | ○         |        |    |    |
| 7th  | ○       | ○      |        | ○         |          |           |        | ○  |    |
| Rev. | ○       |        |        | ○         |          |           | ○      |    |    |

*FIG.2*

CONTROLLER OF STEPPED AUTOMATIC TRANSMISSION

TECHNICAL FIELD

The present invention relates to a controller of a stepped automatic transmission, and more particularly, to downshift during coasting.

BACKGROUND ART

There is known a stepped automatic transmission that has a plurality of lock-up elements and performs downshift by changing over a pair of lock-up elements including an open side lock-up element and a lock-up side lock-up element during coasting while an engine has a fuel cut-off state (refer to JP 2010-60065A).

SUMMARY OF INVENTION

However, in the technique disclosed in JP 2010-60065A, a negative acceleration is generated in a vehicle due to downshift during costing. This negative vehicle acceleration generates a torque tending to stop a vehicle movement (coasting torque). This coasting torque generates a so-called benddown shock feeling, by which an upper body of a driver may bend down forward in a vehicle travel direction, and may degrade a drive feeling.

It is therefore an object of this invention to provide an apparatus capable of alleviating a gear-shift shock, caused by downshift during coasting, such as a bend-down shock feeling.

According to an aspect of the invention, there is provided a controller of a stepped automatic transmission. The stepped automatic transmission has a plurality of lock-up elements and performs downshift during coasting while an engine has a fuel cut-off state by changing over a pair of lock-up elements including an open side lock-up element and a lock-up side lock-up element. The downshift operation includes torque phase control and inertia phase control. The controller includes: a fuel cut-off recovery executing section that performs recovery from the fuel cut-off state for an inertia phase control period; and a cylinder number restricting section that restricts the number of cylinders recovered from the fuel cut-off state.

The foregoing and additional features and characteristics of this disclosure will become more apparent from the following detailed description considered with the reference to the accompanying drawings.

BRIEF DESCRIPTION OF DRAWINGS

FIG. 2 is a lock-up operation table of each frictional lock-up element at each speed level according to the first embodiment;

DESCRIPTION OF EMBODIMENTS

Hereinafter, embodiments of the present invention will be described with reference to the accompanying drawings.

First Embodiment

Figure 1:
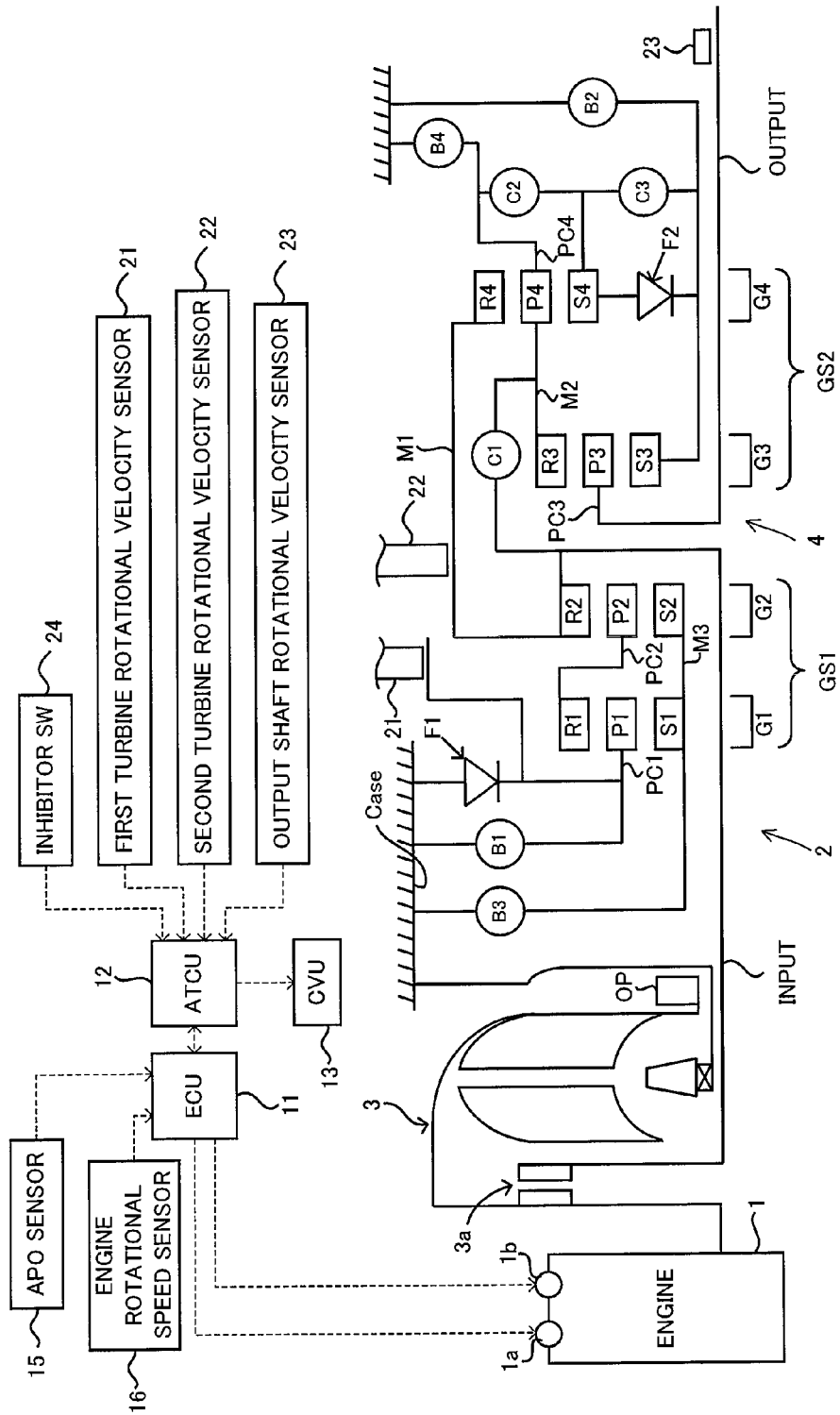
FIG. 1 is a schematic diagram illustrating a stepped automatic transmission according to a first embodiment of the invention.

FIG. 1 is a schematic diagram illustrating a stepped automatic transmission 2 according to a first embodiment of the invention.

The stepped automatic transmission 2 is a combination of a torque converter 3 and a forward 7-speed and backward 1-speed planetary gear transmission 4. A driving force of an engine 1 is input to an input shaft INPUT of the planetary gear transmission 4 through the torque converter 3, and a rotational velocity is changed by four planetary gears and seven frictional lock-up elements (frictional elements), so that the driving force is output from the output shaft OUTPUT. The stepped automatic transmission 2 and the engine 1 are mounted on a vehicle (not illustrated). The aforementioned planetary gear transmission 4 will now be described in brief.

Along the path from the input shaft INPUT to the output shaft OUTPUT, a first planetary gear set GS1 including a first planetary gear G1 and a second planetary gear G2 and a second planetary gear set GS2 including a third planetary gear G3 and a fourth planetary gear G4 are sequentially arranged. The seven frictional lock-up elements include first to third clutches C1, C2, and C3 and first to fourth brakes B1, B2, B3, and B4. In addition, a first free wheeling clutch F1 and a second free wheeling clutch F2 are arranged.

The first planetary gear G1 has a first sun gear S1, a first ring gear R1, and a first carrier PC1 that supports a first pinion P1 meshing with the first sun gear S1 and the first ring gear R1. The second planetary gear G2 has a second sun gear S2, a second ring gear R2, and a second carrier PC2 that supports a second pinion P2 meshing with the second sun gear S2 and the second ring gear R2. The third planetary gear G3 has a third sun gear S3, a third ring gear R3, and a third carrier PC3 that supports a third pinion P3 meshing with the third sun gear S3 and the third ring gear R3. The fourth planetary gear G4 has a fourth sun gear S4, a fourth ring gear R4, and a fourth carrier PC4 that supports a fourth pinion P4 meshing with the fourth sun gear S4 and the fourth ring gear R4.

The input shaft INPUT is connected to the second ring gear R2 to receive a rotational driving force from the engine 1 through the torque converter 3. The output shaft OUTPUT is connected to the third carrier PC3 to transmit the output rotational driving force to a driving wheel through a final gear and the like.

The first ring gear R1, the second carrier PC2, and the fourth ring gear R4 are connected to each other through a first link member M1 in an integrated manner. The third ring gear R3 and the fourth carrier PC4 are connected to each other through a second link member M2 in an integrated manner. The first sun gear S1 and the second sun gear S2 are connected to each other through a third link member M3 in an integrated manner.

The first planetary gear set GS1 includes four rotational elements by connecting the first and second planetary gears G1 and G2 through the first and third link members M1 and M3. In addition, the second planetary gear set GS2 includes five rotational elements by connecting the third and fourth planetary gears G3 and G4 through the second link member M2.

In the first planetary gear set GS1, a torque is input from the input shaft INPUT to the second ring gear R2, and the input torque is output to the second planetary gear set GS2 through the first link member M1. In the second planetary gear set GS2, a torque is directly input to the second link member M2 from the input shaft INPUT and is also input to the fourth ring gear R4 through the first link member M1. The input torque is output to the output shaft OUTPUT from the third carrier PC3.

The first clutch C1 (input clutch I/C) is a clutch that selectively connects/disconnects the input shaft INPUT and the second link member M2. The second clutch C2 (direct clutch D/C) is a clutch that selectively connects/disconnects the fourth sun gear S4 and the fourth carrier PC4. The third clutch C3 (H&LR clutch H&m/C) is a clutch that selectively connects/disconnects the third and fourth sun gears S3 and S4.

The second free wheeling clutch F2 is arranged between the third and fourth sun gears S3 and S4. As a result, the third and fourth sun gears S3 and S4 generate an independent rotational velocity when the third clutch C3 is opened and a rotational velocity of the fourth sun gear S4 is higher than that of the third sun gear S3. Therefore, the third and fourth planetary gears G3 and G4 are connected to each other through the second link member M2, so that each planetary gear achieves an independent gear ratio.

The first brake B1 (front brake Fr/B) is a brake that selectively stops rotation of the first carrier PC1 with respect to a transmission housing CASE. In addition, the first free wheeling clutch F1 is arranged in parallel with the first brake B1. The second brake B2 (low brake LOW/B) is a brake that selectively stops rotation of the third sun gear S3 with respect to the transmission housing CASE. The third brake B3 (2346 brake 2346/B) is a brake that selectively stops rotation of the third link member M3 that connects the first and second sun gears S1 and S2 with respect to the transmission housing CASE. The fourth brake B4 (reverse brake R/B) is a brake that selectively stops rotation of the fourth carrier PC3 with respect to the transmission housing CASE.

FIG. 2 is a lock-up operation table illustrating a lock-up state of each frictional lock-up element for each speed level (each gear position) in the planetary gear transmission 4. In FIG. 2, a circle mark O indicates that the corresponding frictional lock-up element is locked. The bracketed circle mark (O) indicates that the corresponding frictional lock-up element is locked while a range position for operating an engine brake is selected. A blank indicates that the corresponding frictional lock-up element is opened.

The planetary gear transmission 4 can implement forward 7-speed and backward 1-speed gear stages by changing over a pair of frictional lock-up elements such that a frictional lock-up element that has been locked during upshift or downshift is opened, and a frictional lock-up element that has been opened is locked. That is, in the "first speed level," only the second brake B2 is locked, and the first free wheeling clutch F1 and the second free wheeling clutch F2 are engaged. In the "second speed level," the second and third brakes B2 and B3 are locked, and the second free wheeling clutch F2 is engaged. In the "third speed level," the second and third brakes B2 and B3 and the second clutch C2 are locked, and both the first and second free wheeling clutches F1 and F2 are not engaged.

In the "fourth speed level," the third brake B3 and the second and third clutches C2 and C3 are locked. In the "fifth speed level," the first to third clutches C1, C2, and C3 are locked. In the "sixth speed level," the third brake B3 and the first and third clutches C1 and C3 are locked. In the "seventh speed level," the first brake B1, the first and third clutches C1 and C3 are locked, and the first free wheeling clutch F1 is engaged. In the "backward speed level," the first and fourth brakes B1 and B4 and the third clutch C3 are locked.

Returning to FIG. 1, an oil pump OP is provided in the same shaft as that of a pump impeller of the torque converter 3. The oil pump OP is rotatably driven by the driving force of the engine 1 to pump the oil to each frictional lock-up element. The torque converter 3 has a lock-up clutch 3a for removing a rotation difference between the pump impeller and a turbine runner.

There are provided an engine controller 11, an autotransmission controller 12, and a control valve unit 13 that controls a hydraulic pressure of each frictional lock-up element based on the output signals from the autotransmission controller 12. The engine controller 11 and the autotransmission controller 12 are connected to each other through a CAN communication line and the like to share sensor information or control information through communication.

The engine controller 11 receives a signal from an accelerator position sensor (APO sensor) 15 that detects an accelerator pedal pressing level (accelerator opening level) of a driver and a signal from the engine rotational velocity sensor 16 that detects an engine rotational velocity Ne. The engine controller 11 basically controls an engine output rotational velocity and an engine torque by controlling a fuel injection amount injected from a fuel injection valve 1a and spark ignition performed by an ignition plug 1b based on the engine rotational velocity Ne and the accelerator opening level. Here, although description will be given by assuming that the engine 1 is a gasoline engine, the invention may also apply to a diesel engine.

Meanwhile, in order to improve fuel efficiency, the engine controller 11 (fuel cut-off recovery section) performs so-called fuel cut-off that stops fuel supply of the fuel injection valve 1a and spark ignition of the ignition plug 1b. That is, if a fuel cut-off condition is satisfied, fuel cut-off is performed to stop driving of the engine 1 (fuel cut-off state). If the fuel cut-off recovery condition is satisfied in the fuel cut-off state, recovery from the fuel cut-off state is performed, that is, the fuel supply and the spark ignition are resumed (fuel cut-off recovery). For example, if it is not necessary to accelerate a vehicle, a driver recovers the accelerator pedal. When the vehicle speed is equal to or lower than the fuel cut-off vehicle speed, it is determined that the fuel cut-off condition is satisfied, and the fuel cut-off is performed. Meanwhile, if a vehicle speed is continuously lowered during the fuel cut-off and becomes equal to or lower than the fuel cut-off recovery vehicle speed, fuel cut-off recovery is performed in order to prevent an engine stall.

The autotransmission controller 12 receives signals from a first turbine rotational velocity sensor 21, a second turbine rotational velocity sensor 22, an output shaft rotational velocity sensor 23, and an inhibitor switch (inhibitor SW) 24. Here, the first turbine rotational velocity sensor 21 detects a rotational velocity of the first carrier PC1, the second turbine rotational velocity sensor 22 detects a rotational velocity of the first ring gear R1, and the output shaft rotational velocity sensor 23 detects a rotational velocity of the output shaft OUTPUT. It is possible to obtain a vehicle speed VSP from the rotational velocity of the output shaft OUTPUT. The inhibitor switch 24 detects a range position selected when a driver operates a selector.

When a D-range is selected, the autotransmission controller 12 selects an optimal instruction speed level based on the vehicle speed VSP and the accelerator opening level APO and outputs a control instruction for achieving the instruction speed level to a control valve unit 30.

Figure 3:
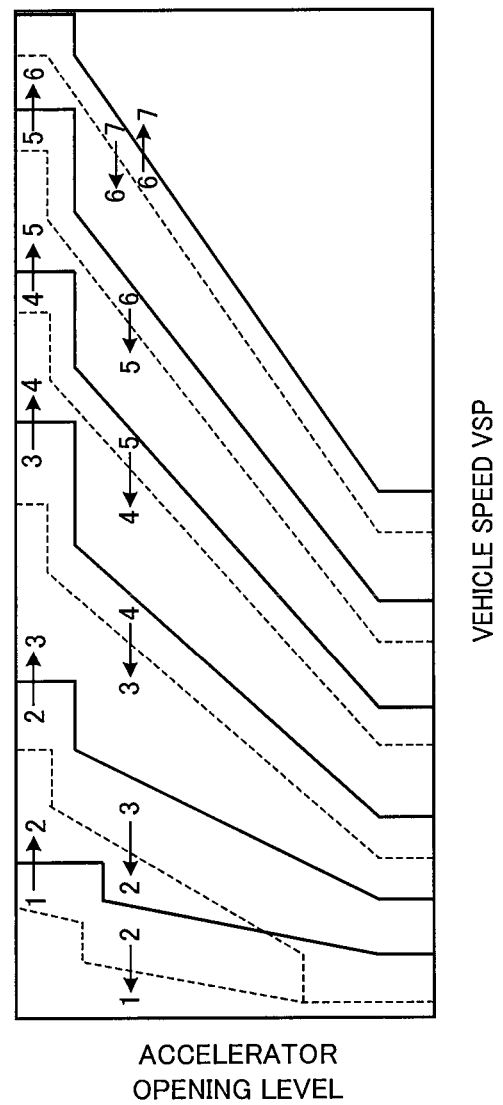
FIG. 3 is a gear-shift diagram according to the first embodiment.

This gear-shift control performed by the autotransmission controller 12 will be described in brief. FIG. 3 is a gear-shift diagram used in the gear-shift control when the D-range is selected. In FIG. 3, the solid line indicates an upshift line, and the dotted line indicates a downshift line.

When the D-range is selected, a search is performed for a position where a drive point determined based on the vehicle speed VSP from the output shaft rotational velocity sensor 23 (vehicle speed sensor) and the accelerator opening level APO from the accelerator position sensor 1 is located on the gear-shift diagram. In addition, if the drive point does not move, or the drive point still remains in a single speed level area on the gear-shift diagram of FIG. 3 even when the drive point moves, the speed level at that moment is maintained without any change.

Meanwhile, as the drive point moves and crosses an upshift line on the gear-shift diagram of FIG. 3, an upshift instruction from the speed level indicated by the area where the drive point exists before the crossing to the speed level indicated by the area where the drive point exists after the crossing is output. In addition, as the drive point moves and crosses a downshift line on the gear-shift diagram of FIG. 3, a downshift instruction from the speed level indicated by the area where the drive point exists before the crossing to the speed level indicated by the area where the drive point exists after the crossing is output. Due to the downshift instruction, shifting is performed from the speed level indicated by the area where the drive point exists before crossing of the downshift line to the speed level indicated by the area where the drive point exists after crossing of the downshift line. For example, if the gear stage is at the (N)th speed level before the crossing, the gear stage is changed to the (N−1)th speed level after the crossing. Here, "N" denotes a natural number from 2 to 7, and the "downshift" refers to downward gear-shift by which the speed level is lowered.

Next, downshift during coasting will be described in detail. Here, "coasting" refers to a state that a vehicle is driven under an inertial force while the engine 1 is in a fuel cut-off state.

Figure 4:
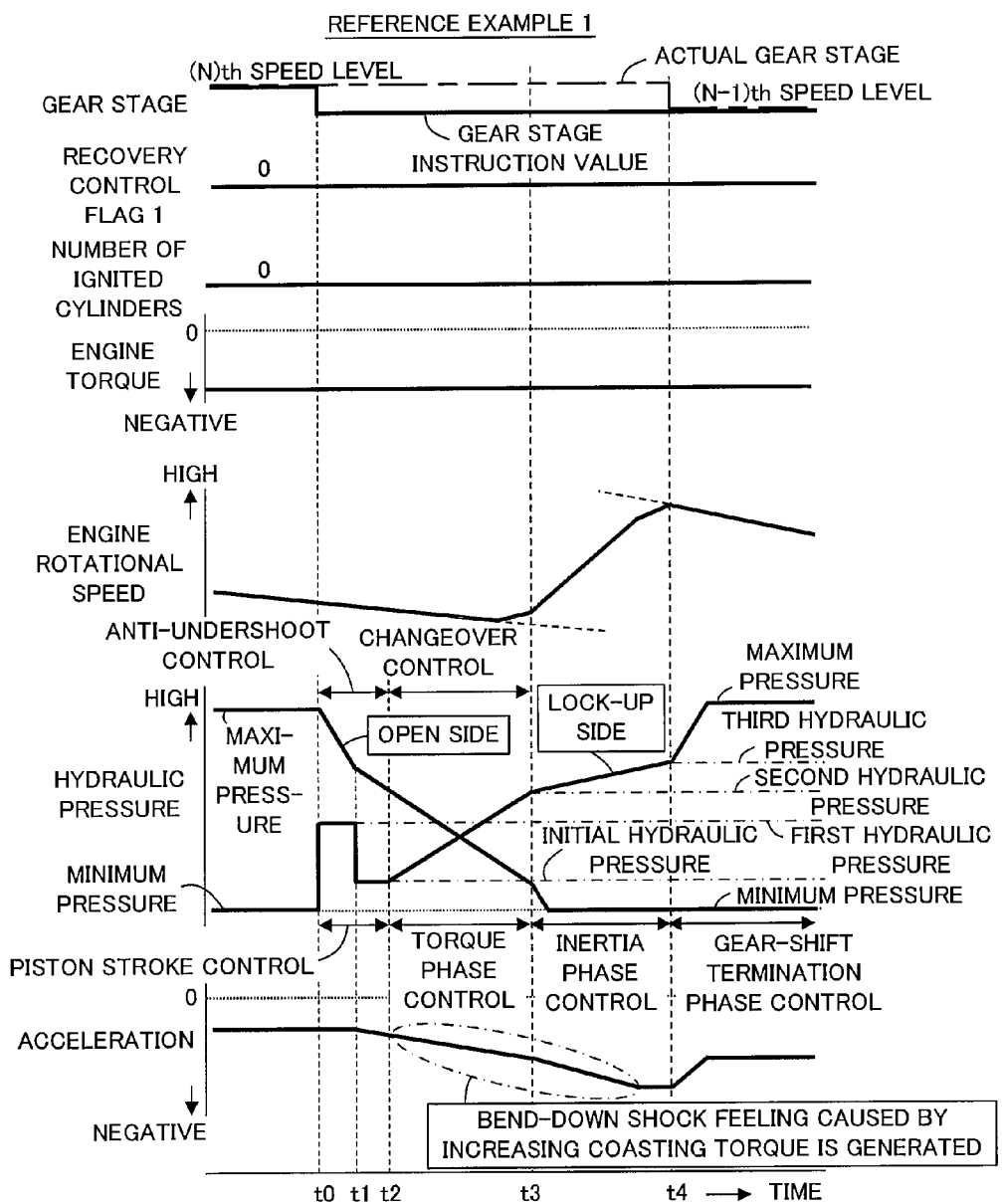
FIG. 4 is a timing chart illustrating a hydraulic pressure change and the like in the frictional lock-up element according to Reference Example 1 when downshift is performed during coasting.
Figure 5:
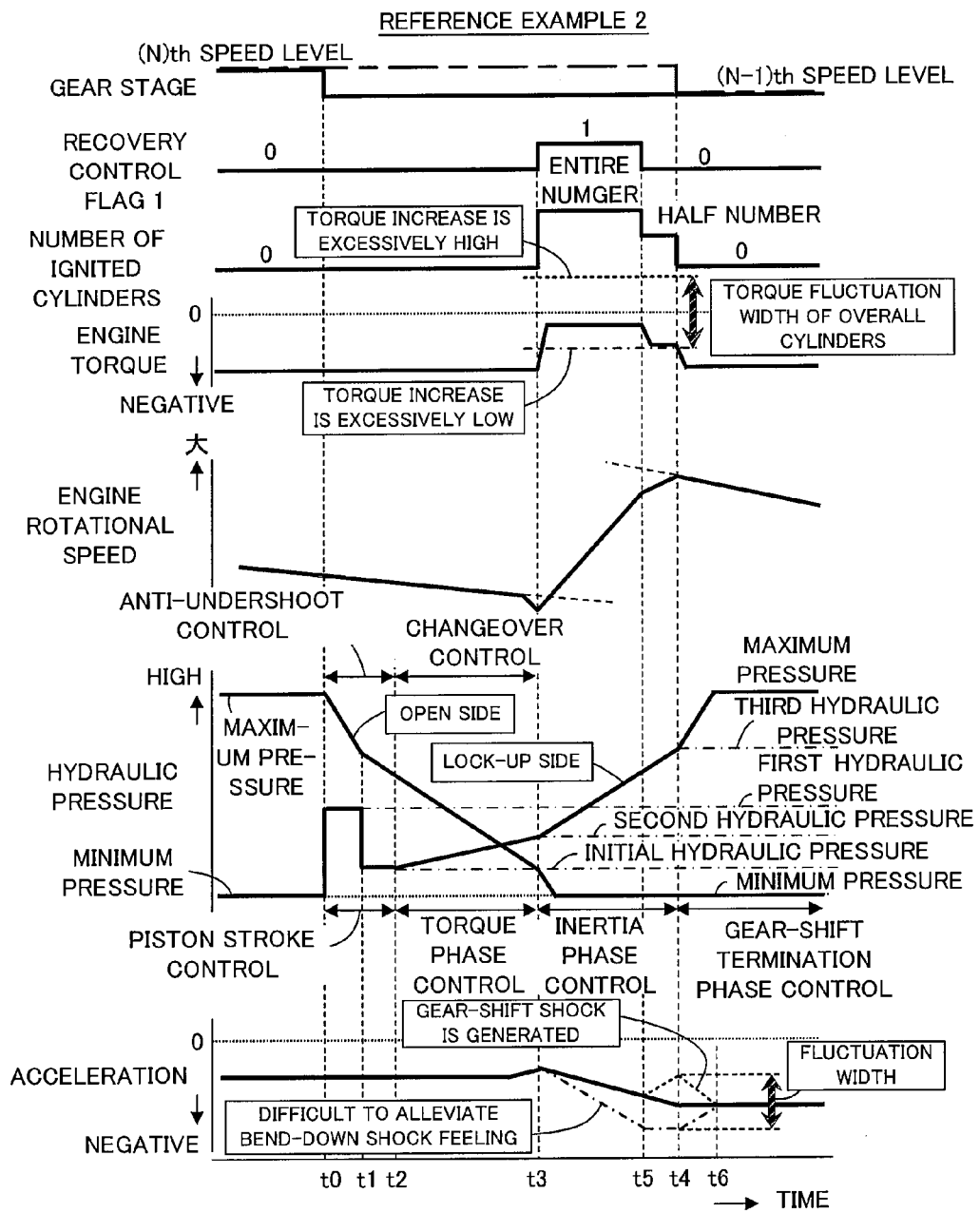
FIG. 5 is a timing chart illustrating a hydraulic pressure change and the like in the frictional lock-up element according to Reference Example 2 when downshift is performed during coasting.
Figure 6:
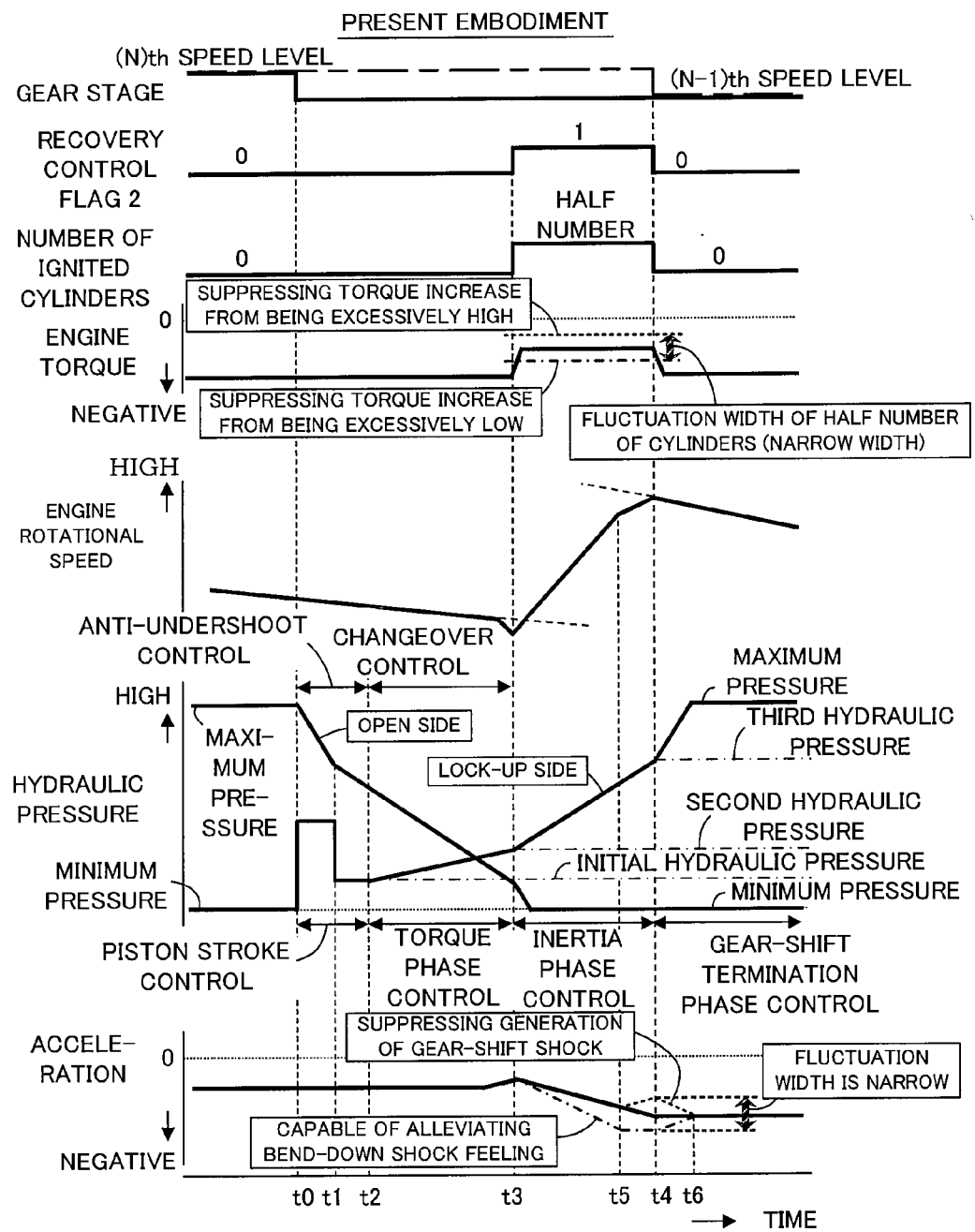
FIG. 6 is a timing chart illustrating a hydraulic pressure change and the like in the frictional lock-up element according to the first embodiment when downshift is performed during coasting.

FIGS. 4, 5, and 6 are timing charts obtained by modeling how the engine rotational velocity, hydraulic pressures of a pair of frictional lock-up elements including the open side lock-up element and the lock-up side lock-up element, an acceleration generated in a vehicle, and the like are changed when downshift during coasting is performed according to Reference Examples 1 and 2 and the first embodiment. Here, for the purpose of simplification, it is assumed that a pair of the frictional lock-up elements including the open side lock-up element and the lock-up side lock-up element are a pair of clutches connected/disconnected by a hydraulic pressure, and a piston is used to drive each clutch. In addition, it is assumed that supply of a hydraulic pressure to each clutch is not delayed, and an instruction hydraulic pressure applied to each clutch matches an actual hydraulic pressure of each clutch.

First, description will be made for FIG. 4. In Reference Examples 1 and 2, it is assumed that downshift is performed as a premise of the first embodiment.

The downshift is performed by changing over a pair of clutches including the open side clutch and the lock-up side clutch. In this case, each clutch is opened or locked depending on a hydraulic pressure applied to each clutch. Therefore, in the sixth graph of FIG. 4, a hydraulic pressure of the open side clutch and a hydraulic pressure of the lock-up side clutch are overlappingly illustrated.

It is assumed that a downshift instruction from the (N)th speed level to the (N−1)th speed level is output at timing t0 during coasting (refer to the solid line on top of FIG. 4). In this case, piston stroke control for the lock-up side clutch is performed for a short period t0 to t1. That is, the hydraulic pressure applied to the lock-up side clutch for a short period t0 to t1 increases stepwise from a minimum pressure to a first hydraulic pressure, and the hydraulic pressure decreases stepwise from the first hydraulic pressure to an initial hydraulic pressure for a period t1 to t2. First, the hydraulic pressure increases stepwise to the first hydraulic pressure in order to expedite activation of the piston of the lock-up side clutch. Then, the hydraulic pressure decreases stepwise to the initial hydraulic pressure because a high hydraulic pressure is not necessary after the clutch piston starts to move.

Anti-undershoot control is performed for the open side clutch while piston stroke control is performed for the lock-up side clutch. This control is performed in order to prevent a decrease (undershooting) of the rotational velocity more than necessary because, if the open side clutch is opened immediately by decreasing the hydraulic pressure applied to the open side clutch from the maximum pressure to the minimum pressure, the engine rotational velocity immediately decreases, and it is difficult to increase the rotational velocity again. That is, the hydraulic pressure applied to the open side clutch at timing t0 does not decrease stepwise from the maximum pressure to the minimum pressure. Instead, the hydraulic pressure applied to the open side clutch for a period t0 to t1 decreases abruptly from the maximum pressure at a predetermined descending gradient. For a period t1 to t2, the hydraulic pressure decreases smoothly at a predetermined descending gradient.

For a torque phase control period t2 to t3, torque phase control is performed for the lock-up side clutch. This control generates a torque such that a rotational velocity tends to approach the rotational velocity implemented when the lock-up side clutch is locked by increasing a pressing force necessary in the lock-up. That is, the hydraulic pressure applied to the lock-up side clutch increases smoothly with a predetermined ascending gradient from the initial hydraulic pressure to the second hydraulic pressure (second hydraulic pressure>first hydraulic pressure). The second hydraulic pressure is a hydraulic pressure capable of maintaining a state of the lock-up side clutch regardless of whether it is locked or not (slips or not).

While torque phase control is performed for the lock-up side clutch, clutch changeover control is performed for the open side clutch. That is, the hydraulic pressure of the open side clutch further decreases with a predetermined descending gradient.

At timing t3 in which the hydraulic pressure of the lock-up side clutch reaches the second hydraulic pressure, the lock-up side clutch has a transitional state regarding whether or not the lock-up side clutch is locked, that is, whether or not the engine side clutch and the drive wheel side clutch are locked in the planetary gear transmission 4. Hereinafter, an engine side of the planetary gear transmission 4 will be referred to as an "engine side portion," and a drive wheel side of the planetary gear transmission 4 will be referred to as a "wheel side portion."

Then, for an inertia phase control period t3 to t4, inertia phase control is performed for the lock-up side clutch. This control causes the engine rotational velocity to transit from the rotational velocity before the changeover to the rotational velocity after the changeover. That is, the hydraulic pressure of the lock-up side clutch smoothly increases from the second hydraulic pressure to the third hydraulic pressure with a predetermined ascending gradient. At timing t3, the lock-up side clutch has a transitional state regarding whether or not the engine side portion and the drive-wheel side portion are locked. Therefore, if the hydraulic pressure of the lock-up side clutch increases over the second hydraulic pressure from timing t3, this means that the engine side portion and the wheel side portion are locked using the lock-up side clutch. Immediately before timing t3, the rotational velocity is different between the engine side portion and the wheel side portion, and the rotational velocity of the engine side portion is lower than the rotational velocity of the wheel side portion. For this reason, if the lock-up side clutch is locked, the engine side portion is locked together with the wheel side portion rotating by an inertial force from the drive wheel side. Therefore, due to an inertial force of the wheel side portion, the rotational velocity of the engine side portion increases toward the rotational velocity of the wheel side portion. For this reason, the rotational velocity of the engine side portion (that is, engine rotational velocity) increases to the rotational velocity of the wheel side portion from timing t3.

As the engine rotational velocity increases, the inertia phase control is terminated at timing t4 in which the engine rotational velocity matches the rotational velocity of the wheel side portion. While the inertia phase control is performed for the lock-up side clutch, the hydraulic pressure applied to the open side clutch is maintained at the minimum pressure.

At timing t4 in which the inertia phase control is terminated, downshift is also terminated. Therefore, at timing t4, an actual gear stage is shifted to the (N−1)th speed level (refer to a dotted line on top of FIG. 4).

From timing t4, a gear-shift termination phase is executed for the lock-up side clutch. This control is a post-processing for ensuring the lock-up. That is, the hydraulic pressure applied to the lock-up side clutch increases to the maximum pressure from the third hydraulic pressure with a predetermined ascending gradient. After the maximum pressure is reached, the maximum pressure is maintained.

In this manner, hydraulic pressure control for downshift is performed by changing over a pair of clutches including the lock-up side clutch and the open side clutch.

However, when downshift during coasting is performed, an acceleration applied to a vehicle smoothly increases toward a negative side from timing t1 to timing t4 in which the inertia phase control is terminated as illustrated in the bottom graph of FIG. 4. A torque generated by the vehicle acceleration increasing to the negative side due to the downshift during coasting is referred to as a coasting torque. As the vehicle acceleration increases toward the negative side, the coasting torque also increases. This increasing coasting torque generates a so-called bend-down shock feeling, by which an upper body of a driver may bend down forward in a vehicle travel direction, and may degrade a drive feeling.

In this regard, Reference Example 2 was conceived, in which fuel cut-off recovery is introduced in order to reduce a coasting torque generated by downshift during coasting and alleviate a bend-down shock feeling in Reference Example 1. Description will now be made for Reference Example 2 with reference to FIG. 5.

FIG. 5 is a timing chart illustrating Reference Example 2 obtained by modeling how an engine rotational velocity, hydraulic pressures of a pair of clutches including the open side clutches and the lock-up side clutches, a vehicle acceleration, and the like are changed when downshift during coasting is performed. Similarly, in Reference Example 2, it is assumed that the downshift during coasting is performed under the same condition as that of Reference Example 1. In Reference Example 2 of FIG. 5, like reference numerals denote like elements as in Reference Example 1 of FIG. 4.

In Reference Example 2 of FIG. 5, a recovery control flag 1, the number of ignited cylinders, and an engine torque change are additionally described. Furthermore, for comparison with Reference Example 2 of FIG. 5, the recovery control flag 1, the number of ignited cylinders, and the engine torque change are also described in Reference Example 1 of FIG. 4.

Reference Example 2 of FIG. 5 is different from Reference Example 1 of FIG. 4 in that fuel cut-off recovery for overall cylinders is performed for an inertia phase control period t3 to t4. The fuel cut-off recovery for overall cylinders is introduced in Reference Example 2 in order to prevent degradation of a drive feeling that may be generated by a vehicle acceleration increasing toward a negative side when downshift during coasting is performed. The fuel cut-off recovery for overall cylinders newly introduced in Reference Example 2 is different from typical fuel cut-off recovery in its objective. In typical fuel cut-off recovery, it is determined that a fuel cut-off recovery condition is satisfied when an engine rotational velocity during fuel cut-off decreases to be equal to or lower than a fuel cut-off recovery rotational velocity, or when a vehicle speed decreases to be equal to or lower than a fuel cut-off recovery vehicle speed, so that fuel supply to an engine 1 and spark ignition are resumed. In typical fuel cut-off recovery, if the engine rotational velocity or the vehicle speed further decreases during fuel cut-off, an engine stall may occur. Therefore, an objective of the typical fuel cut-off recovery is to prevent such a phenomenon. Since an objective of the fuel cut-off recovery is different as described above, the fuel cut-off recovery for overall cylinders introduced in Reference Example 2 may be performed even when the engine rotational velocity during coasting does not decrease to be equal to or lower than the fuel cut-off recovery rotational velocity, or even when the vehicle speed decreases to be equal to or lower than the fuel cut-off recovery vehicle speed. In order to distinguish from the typical fuel cut-off recovery, hereinafter, the fuel cut-off recovery for overall cylinders performed in Reference Example 2 will be referred to as "coast downshift fuel cut-off recovery."

Specifically, as illustrated in the third graph of FIG. 5, the coast downshift fuel cut-off recovery for overall cylinders is performed only for a front half period t3 to t5, and the coast downshift fuel cut-off recovery for a half number of cylinders is performed for a rear half period t5 to t4. For example, in the case of a 6-cylinder engine, the coast downshift fuel cut-off recovery is performed for all of the six cylinders for a front half period, and the coast downshift fuel cut-off recovery is performed for three cylinders, which is a half number, for a rear half period.

Here, the engine rotational velocity increases during the inertia phase control, and an inclination becomes slightly gentle before timing t4. Therefore, this timing is set as "t5." The timing t5 may be detected using an engine rotational velocity sensor 2 or may be determined such that a period t3 to t5 is suitably set to a predetermined time in advance, and it is determined that the timing t5 is reached when a predetermined time elapses from timing t3. That is, in order to perform coast downshift fuel cut-off recovery, the recovery control flag 1 is newly introduced, and the recovery control flag is set to "1" for a front half period t3 to t5. Using the recovery control flag 1, the coast downshift fuel cut-off recovery is performed for overall cylinders when the recovery control flag 1 is set to "1." For a predetermined time after the recovery control flag 1 is changed to "0," the coast downshift fuel cut-off recovery is performed for a half number of cylinders.

By performing the coast downshift fuel cut-off recovery, the engine torque increases to zero from timing t3 and settles down at a negative value close to zero (refer to the solid line of the third graph of FIG. 5). The negative side close to zero is set as a target because, if a positive engine torque is generated during coasting, in which the vehicle speed smoothly decreases, the generated engine torque unexpectedly accelerates a vehicle, so that a drive feeling during coasting may be degraded. In addition, this can also suppress an unnecessary fuel consumption.

The number of ignited cylinders is switched to a half number before timing t4 in order to prevent a torque shock. That is, since the engine side portion and the wheel side portion are locked at timing t4, a driver may feel a torque shock if a torque change is significant at timing t4. In this regard, the torque shock is prevented by reducing a torque generated in the engine for a rear half period t5 to t4 to a half. In addition, since the engine side portion and the wheel side portion are in the process of changeover between a lock-up state and an open state at timing t3, a driver does not feel a shock even when the engine torque (torque increase) is generated stepwise at timing t3.

If a torque increase for the inertia phase control period is predicted, it is possible to obtain a gentle ascending gradient of the hydraulic pressure applied to the lock-up side clutch for the torque phase control period t2 to t3, compared to the case of Reference Example 1 of FIG. 4. That is, as illustrated in the sixth graph of FIG. 5, the hydraulic pressure applied to the lock-up side clutch for the torque phase control period t2 to t3 increases from the minimum pressure to the second hydraulic pressure with an ascending gradient gentler than that of Reference Example 1. The second hydraulic pressure in Reference Example 2 is lower than the first hydraulic pressure.

In this manner, if the ascending gradient for the torque phase control period t2 to t3 is gentler than that of Reference Example 1 of FIG. 4, it is possible to maintain the vehicle acceleration to a nearly constant value for the period t1 to t3 (refer to the bottom graph of FIG. 5). Since the vehicle acceleration is maintained in a nearly constant value, the coasting torque decreases, and a bend-down shock feeling is alleviated.

Meanwhile, since the second hydraulic pressure is lower than that of Reference Example 1, the hydraulic pressure applied to the lock-up side clutch rises from the second hydraulic pressure to the third hydraulic pressure with a steep ascending gradient, compared to that of Reference Example 1, for the inertia phase control period t3 to t4.

However, it is newly recognized that a gear-shift shock is generated before and after timing t4 due to a torque fluctuation in the engine side portion input to the wheel side portion (that is, uneven engine torque). Through an analysis performed by the inventors, it is recognized that a torque fluctuation width generated when the coast downshift fuel cut-off recovery is performed for overall cylinders is large (refer to the arrow), and the engine torque becomes positive due to an uneven torque increase in some cases as illustrated in the fourth graph of FIG. 5. Specifically, referring to the fourth graph of FIG. 5, if it is assumed that the solid line denotes a target engine torque (torque increase) for a period t3 to t4, the engine torque may be excessively higher than the assumed target torque increase (refer to the dotted line) or may be excessively lower than the assumed target torque increase (refer to the one-dotted chain line) in some cases.

Such an uneven torque increase generates a fluctuation width of the vehicle acceleration as illustrated in the bottom graph of FIG. 5. Specifically, referring to the bottom graph of FIG. 5, if it is assumed that the solid line denotes a target acceleration assumed for the time subsequent to t3, the acceleration may upwardly deviate from the upper limit of the assumed target acceleration (refer to the dotted line) or may downwardly deviate from the lower limit of the assumed target acceleration (refer to the one-dotted chain line) in some cases.

Specifically, in a case where the torque increase caused by the coast downshift fuel cut-off recovery is excessively higher than the assumed target value, a clutch capacity resultantly becomes excessive more than the assumed target value. As a result, the vehicle acceleration temporarily increases toward zero deviating from the target value before and after timing t4 (t5 to t6) (refer to the dotted line in the bottom graph of FIG. 5). Such a spike of the torque change for a period t5 to t6 generates a gear-shift shock.

Meanwhile, in a case where the torque increase caused by the coast downshift fuel cut-off recovery is excessively lower than the assumed target value, the clutch capacity resultantly becomes excessively lower than the assumed target value. As a result, the vehicle acceleration deviates from the target value and increases toward a negative side from timing t3 and is maintained in a constant value for a period t5 to t4. Then, the vehicle acceleration is reversed and becomes close to the target value after timing t4 (refer to the one-dotted chain line in the bottom graph of FIG. 5). In this manner, if the vehicle acceleration increases toward a negative side from timing t3, it is difficult to expect alleviation of a bend-down shock feeling caused by reducing a coasting torque, which is originally expected in Reference Example 2.

In this regard, according to the first embodiment of the invention, the engine controller 11 (cylinder number restricting section) restricts the number of cylinders corresponding to the coast downshift fuel cut-off recovery based on Reference Example 2. Here, "restricting the number of cylinders" means that the number of cylinders is smaller than a total number of cylinders. If a 6-cylinder engine is employed, for example, the number of cylinders corresponding to the coast downshift fuel cut-off recovery is reduced to a half of the total number of cylinders. As a result, an uneven torque increase width caused by the coast downshift fuel cut-off recovery for the inertia phase control period t3 to t4 is reduced, compared to a case where the coast downshift fuel cut-off recovery is performed for overall cylinders.

This will be described in more detail with reference to FIG. 6. FIG. 6 is a timing chart obtained by modeling how the engine rotational velocity, the hydraulic pressures of a pair of clutches including the open side clutch and the lock-up side clutch, the acceleration, and the like are changed according to the first embodiment in a case where downshift during coasting is performed. In the first embodiment, it is assumed that downshift during coasting is also performed under the same condition as that of Reference Example 2. In the first embodiment of FIG. 6, like reference numerals denote like elements as in Reference Example 2 of FIG. 5. Similarly, in the first embodiment of FIG. 6, the recovery control flag 2, the number of ignited cylinders, and the engine torque change are added. However, the recovery control flag 2 of the first embodiment is different from that of the recovery control flag 1 of Reference Example 2.

Focusing on the difference between the first embodiment of FIG. 6 and Reference Example 2 of FIG. 5, the number of cylinders corresponding to the coast downshift fuel cut-off recovery is restricted to a half number of cylinders for the inertia phase control period t3 to t4. If a 6-cylinder engine is employed, the coast downshift fuel cut-off recovery is performed for three cylinders, which is a half number of cylinders. For this control, the recovery control flag 2 is newly introduced, separately from the recovery control flag 1 introduced in Reference Example 2, and the recovery control flag 2 is set to "1" for the inertia phase control period t3 to t4. Using the recovery control flag 2, the coast downshift fuel cut-off recovery is performed only for a half number of cylinders when the recovery control flag 2 is set to "1."

As a result, an uneven torque increase caused by the coast downshift fuel cut-off recovery for a half number of cylinders becomes smaller than an uneven torque increase caused by the coast downshift fuel cut-off recovery for overall cylinders. As the number of cylinders used in combustion decreases, the uneven torque increase width is reduced as illustrated in the fourth graph of FIG. 6. Specifically, in the fourth graph of FIG. 6, it is assumed that the solid line denotes a target engine torque (torque increase) for a period t3 to t4 as in Reference Example 2. In Reference Example 2, the engine torque is excessively higher than the assumed target torque increase (refer to the dotted line) or is excessively lower than the assumed target torque increase (one-dotted chain line) in some cases. However, according to the first embodiment, the uneven torque increase is more suppressed in any case, compared to Reference Example 2.

By suppressing the uneven torque increase, a fluctuation width of the vehicle acceleration is also reduced as illustrated in the bottom graph of FIG. 6. Specifically, in the bottom graph of FIG. 5, it is assumed that the solid line denotes the assumed target acceleration after timing t3 as in Reference Example 2. In Reference Example 2, the acceleration is upwardly deviated from the upper limit of the assumed target acceleration (refer to the dotted line) or is downwardly deviated from the lower limit of the assumed target acceleration (refer to the one-dotted chain line) in some cases. However, according to the first embodiment, the acceleration fluctuation width is suppressed and reduced in any case, compared to Reference Example 2.

Specifically, the torque increase caused by the fuel cut-off recovery is suppressed from being excessively higher than the assumed target torque increase (refer to the dotted line in the fourth graph of FIG. 6). Therefore, a fluctuation width of the vehicle acceleration deviating from the target value before and after timing t4 (t5 to t6) is reduced (refer to the dotted line in the bottom graph of FIG. 6). Since the fluctuation width deviating from the target value is reduced, it is possible to suppress generation of a gear-shift shock.

Meanwhile, since the torque increase caused by the fuel cut-off recovery is suppressed from being excessively lower than the assumed target value (refer to the one-dotted chain line in the fourth graph of FIG. 6), a gradient of the straight line of the vehicle acceleration deviating from a target and going toward a negative side becomes gentle (refer to the one-dotted chain line in the bottom graph of FIG. 6). As a result, it is possible to expect alleviation of a bend-down shock feeling caused by reducing the coasting torque, which is originally expected in Reference Example 2.

In addition, the invention is not limited to a case where the number of cylinders corresponding to the coast downshift fuel cut-off recovery is restricted to a half number of cylinders. The invention can be achieved if the number of cylinders corresponding to the coast downshift fuel cut-off recovery is smaller than a total number of cylinders. Therefore, for example, if a 6-cylinder engine is employed, it is conceivable that the coast downshift fuel cut-off recovery may be performed for any one of one to five cylinders.

This control performed by the engine controller 11 will be described with reference to some flowcharts. The hydraulic pressure control for performing downshift by changing over a pair of clutches including the lock-up side clutch and the open side clutch is already known in the art (refer to JP 2010-60065A), and thus, description thereof using a flowchart will not be repeated here.

Figure 7:
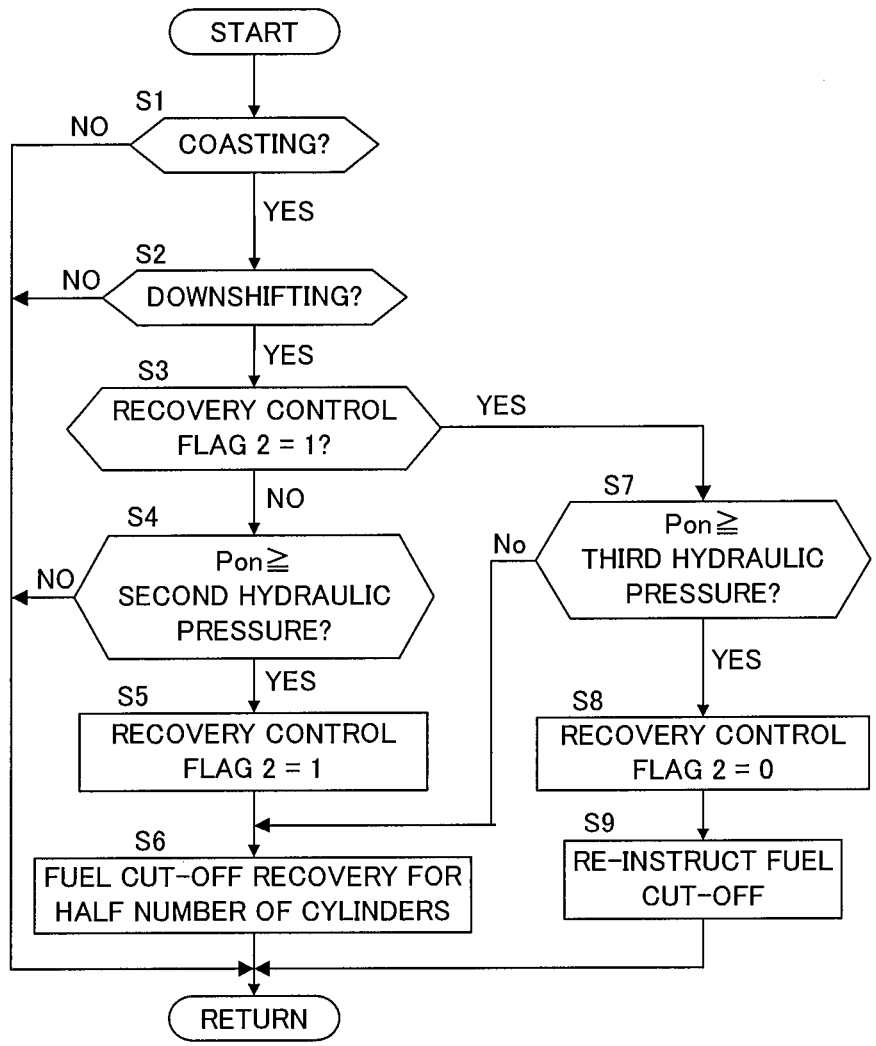
FIG. 7 is a flowchart illustrating coast downshift fuel cut-off recovery control according to the first embodiment.

FIG. 7 is a flowchart illustrating coast downshift fuel cut-off recovery control according to the first embodiment. The processing of the flowchart of FIG. 7 is executed on a regular basis (for example, every 10 ms).

Referring to FIG. 7, in step S1, it is determined whether or not coasting is performed. In step S2, it is determined whether or not downshift is performed. For example, if the vehicle speed VSP detected by the output shaft rotational velocity sensor 23 (vehicle speed sensor) during fuel cut-off decreases, it is determined that coasting is being performed.

The downshift period refers to a period from timing t0 at which downshift starts to timing t4 at which downshift is terminated. Here, if downshift starts when a gear stage is shifted from the (N)th speed level to the (N−1)th speed level according to the downshift instruction (where "N" denotes any natural number 2 to 7), it may be determined that downshift is terminated when an actual gear stage is shifted from the (N)th speed level to the (N−1)th speed level. While coasting is not performed, or while downshift is not performed even during coasting, the process is terminated as it is.

Meanwhile, while downshift is performed during coasting, the process advances to step S3 through steps S1 and S2, so that it is determined whether or not the recovery control flag 2 is set to "1." The recovery control flag 2 is a flag newly introduced to control coast downshift fuel cut-off recovery. If the recovery control flag 2 is set to "1," coast downshift fuel cut-off recovery control is instructed.

In a case where the recovery control flag 2 is set to "0," the process advances to step S4, the hydraulic pressure Pon of the lock-up side frictional lock-up element and the second hydraulic pressure are compared. The second hydraulic pressure is a hydraulic pressure lower than the first hydraulic pressure as illustrated in the sixth graph of FIG. 6. This second hydraulic pressure is suitably set, in advance, to a hydraulic pressure at which the torque phase control is terminated. The hydraulic pressure Pon of the lock-up side frictional lock-up element is detected by a hydraulic pressure sensor (not illustrated). If the hydraulic pressure Pon of the lock-up side frictional lock-up element is lower than the second hydraulic pressure, the process is terminated as it is.

When the hydraulic pressure Pon of the lock-up side frictional lock-up element is equal to or higher than the second hydraulic pressure, it is determined that it is the inertia phase control period, so that the recovery control flag 2 is set to "1" in step S5, and the coast downshift fuel cut-off recovery is performed for a half number of cylinders in step S6.

Since the recovery control flag 2 is set to "1" in step S5, the process advances from step S3 to step S7 in the subsequent chance. In step S7, the hydraulic pressure Pon of the lock-up side frictional lock-up element and the third hydraulic pressure are compared. The third hydraulic pressure is a hydraulic pressure when the engine rotational velocity matches the rotational velocity of the wheel side portion through the inertia phase control. The third hydraulic pressure is suitably set, in advance, to a hydraulic pressure at which the inertia phase control is terminated. When the hydraulic pressure Pon of the lock-up side frictional lock-up element is lower than the third hydraulic pressure, operation of step S6 is continuously performed (that is, coast downshift fuel cut-off recovery).

If the hydraulic pressure Pon of the lock-up side frictional lock-up element is equal to or higher than the third hydraulic pressure, it is determined that the inertia phase control is terminated, so that the process advances to step S8, and the recovery control flag 2 is set to "0" so as to terminate the coast downshift fuel cut-off recovery.

In step S9, fuel cut-off is instructed. As a result, fuel cut-off is performed again after the timing at which the downshift is terminated. Then, if a vehicle speed is equal to or lower than the fuel cut-off vehicle speed, typical fuel cut-off recovery is performed. Meanwhile, when downshift from (N−1)th speed level to the (N−2)th speed level is performed before the vehicle speed becomes equal to or lower than the fuel cut-off vehicle speed, operation subsequent to step S2 of FIG. 7 is performed again.

Here, the effects of the present embodiment will be described.

According to the present embodiment, in the stepped automatic transmission 2 having a plurality of lock-up elements and performing downshift during coasting in which the engine 1 has a fuel cut-off state by changing over a pair of the open side lock-up element and the lock-up side lock-up element, a downshift operation includes torque phase control and inertia phase control, coast downshift fuel cut-off recovery (recovery from the fuel cut-off state) is performed for the inertia phase control period (refer to steps S1 to S6 and S7 of FIG. 7), and the number of cylinders corresponding to the coast downshift fuel cut-off recovery is restricted (refer to step S6 of FIG. 7). Accordingly, an uneven toque increase generated by the coast downshift fuel cut-off recovery is reduced as much as the restricted number of cylinders, compared to Reference Example 2. As a result, a torque increase generated by the coast downshift fuel cut-off recovery becomes close to the assumed target value. Therefore, it is possible to suppress a gear-shift shock generated when the torque increase becomes excessively higher than the target value.

In addition, if the torque increase is excessively lower than the assumed target value, it is difficult to expect alleviation of a bend-down shock feeling caused by reducing a coasting torque, which is originally expected in Reference Example 2. Meanwhile, according to the present embodiment, a torque increase generated by the coast downshift fuel cut-off recovery becomes close to the target value. Therefore, it is possible to expect alleviation of a bend-down shock feeling caused by reducing a coasting torque.

Second Embodiment

Figure 8:
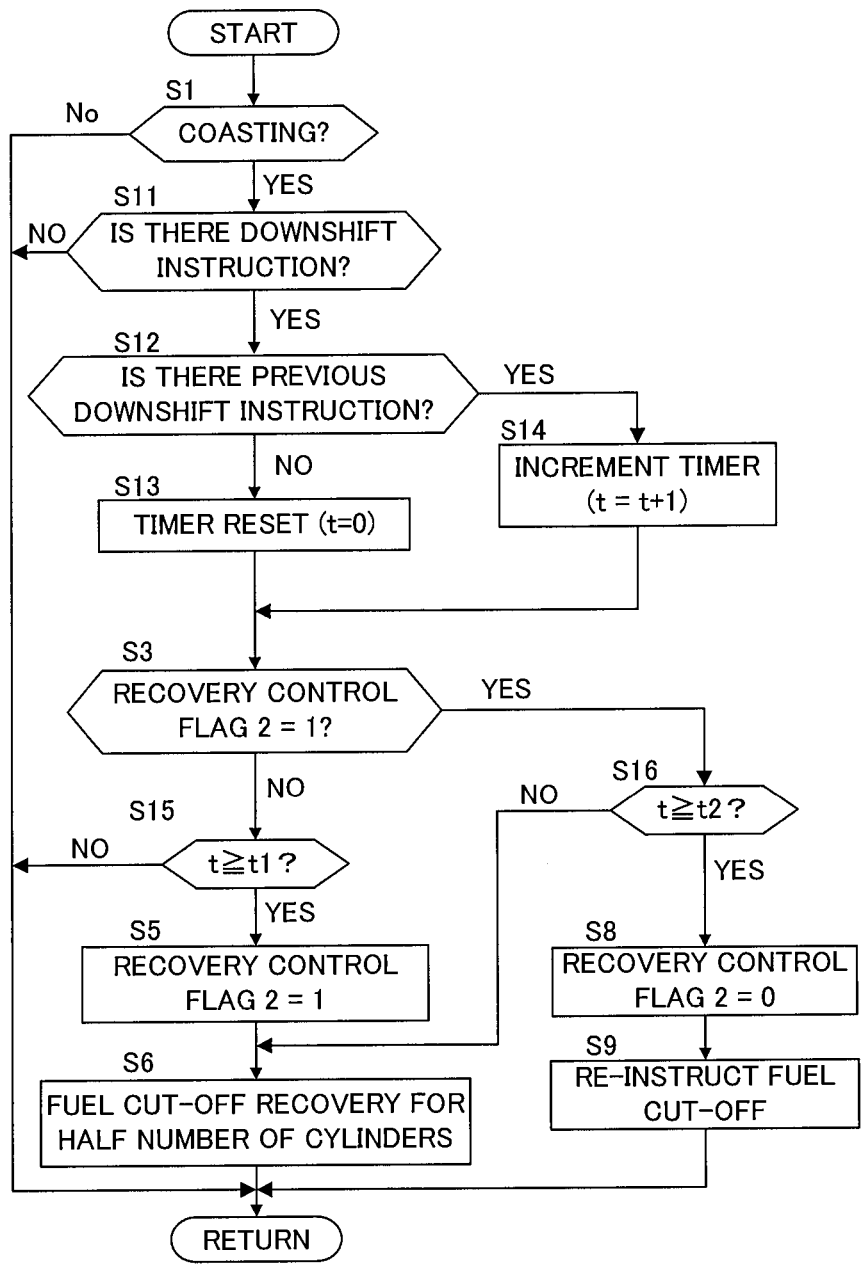
FIG. 8 is a flowchart illustrating coast downshift fuel cut-off recovery control according to a second embodiment.

FIG. 8 is a flowchart illustrating coast downshift fuel cut-off recovery control according to a second embodiment. The processing in the flowchart of FIG. 8 is executed on a regular basis (for example, every 10 ms). Like reference numerals denote like elements as in the flowchart of FIG. 7 of the first embodiment.

In the first embodiment, the recovery control flag 2 is set based on the hydraulic pressure detected by the hydraulic pressure sensor (refer to steps S4 and S7 of FIG. 7). According to the second embodiment, it is possible to perform coast downshift fuel cut-off recovery control without providing a hydraulic pressure sensor.

Description will now be made for a difference from the flowchart of FIG. 7 of the first embodiment. During coasting, the process advances to step S11 and S12, so that it is determined whether or not there is a downshift instruction at a current time or whether or not there was a downshift instruction at a previous time. If there is no downshift instruction at a current time, the process is terminated as it is.

If there is a downshift instruction at a current time, and there was no downshift instruction at a previous time, that is, if a state that there is no downshift instruction at a current time is changed to a state that there is a downshift instruction, it is determined that it is a downshift start timing. In this case, the process advances to step S13 through steps S11 and S12, and a timer is reset (timer value t=0). Then, the process advances to step S3. This timer is provided to measure time after the downshift starts.

Meanwhile, if there is a downshift instruction at a current time, and there was a downshift instruction at a previous time, that is, if a state that there is a downshift instruction is continuously maintained, it is determined that downshift is being performed. In this case, the process advances from steps S11 and S12 to step S14, and the timer value t is incremented by one (timer value t=t+1). Then, the process advances to step S3. The timer value set to "1" corresponds to a control cycle of 10 ms.

In step S3, it is determined whether or not the recovery control flag 2 is set to "1." If the recovery control flag 2 is set to "0," the process advances to step S15, and the timer value t is compared with the first timing t1. In FIG. 6, the first timing t1 corresponds to time elapsing until the second hydraulic pressure is reached after the timing t0. The first timing t1 is suitably set in advance. If the timer value t does not reach the first timing t1, the process is terminated as it is.

If the timer value t is equal to or longer than the first timing t1, it is determined that it is an inertia phase control period. In step S5, the recovery control flag 2 is set to "1." In step S6, coast downshift fuel cut-off recovery is performed for a half number of cylinders.

Since the recovery control flag 2 is set to "1" in step S5, the process advances from step S3 to step S16 in the subsequent chance. In step S16, the timer value t and the second timing t2 are compared. The second timing t2 corresponds to time elapsing until the third hydraulic pressure is reached from the timing t0 in FIG. 6. Similarly, the second timing t2 is suitably set in advance. If the timer value t does not reach the second timing t2, the operation of step 6 (that is, coast downshift fuel cut-off recovery) is continuously performed.

When the timer value t reaches the second timing t2, it is determined that the inertia phase control is terminated, and the process advances to step S8. Since the coast downshift fuel cut-off recovery is terminated, the recovery control flag 2 is set to "1." In step S9, as fuel cut-off is instructed, the fuel cut-off is performed again from the downshift termination timing.

According to the second embodiment, the coast downshift fuel cut-off recovery (recovery from the fuel cut-off state) is performed based on the time elapsing from the start of downshift (refer to steps 11 to 14, 15, and 16 of FIG. 7). Therefore, it is possible to obtain the same effects as those of the first embodiment and reduce costs because the hydraulic pressure sensor is not necessary.

While embodiments of the invention have been described in detail hereinbefore with reference to the accompanying drawings, they not intended to limit the invention to such a specific configuration. Instead, it would be appreciated by those skilled in the art that the embodiments may be changed or modified in various forms within the spirit and scope of the invention and equivalents thereof.

This application claims priority to JP2011-123154 filed with the Japan Patent Office on Jun. 1, 2011, the entire contents of which are incorporated herein by reference.

The invention claimed is:

1. A controller of a stepped automatic transmission, the stepped automatic transmission having a plurality of lock-up elements and performing a downshift during coasting while an engine has a fuel cut-off state by changing over a pair of lock-up elements including an open side lock-up element and a lock-up side lock-up element,
   wherein the downshift includes a torque phase control and an inertia phase control, and
   wherein the controller comprises:
      a fuel cut-off recovery executing unit configured to perform a recovery from the fuel cut-off state when control shifts from the torque phase control to the inertia phase control; and
      a cylinder number restricting unit configured to restrict a count of cylinders from a start of the recovery when the recovery from the fuel cut-off state is performed.

2. The controller of the stepped automatic transmission according to claim 1, wherein the fuel cut-off recovery executing unit is configured to perform the recovery from the fuel cut-off state based on time elapsing after the downshift starts.

3. A controller of a stepped automatic transmission, the stepped automatic transmission having a plurality of lock-up elements and performing a downshift during coasting while an engine has a fuel cut-off state by changing over a pair of lock-up elements including an open side lock-up element and a lock-up side lock-up element,
   wherein the downshift includes a torque phase control and an inertia phase control, and
   wherein the controller comprises:
      a means for performing a recovery from the fuel cut-off state when control shifts from the torque phase control to the inertia phase control; and
      a means for restricting a count of cylinders from a start of the recovery when the recovery from the fuel cut-off state is performed.

* * * * *